United States Patent [19]

Hopper

[11] Patent Number: 4,910,266

[45] Date of Patent: * Mar. 20, 1990

[54] MODIFICATION PROCESS USING N-CHLORO-THIOSULFONAMIDE AND RUBBER

[75] Inventor: Roger J. Hopper, Akron, Ohio

[73] Assignee: The Goodyear Tire & Rubber Company, Akron, Ohio

[*] Notice: The portion of the term of this patent subsequent to Apr. 11, 2006 has been disclaimed.

[21] Appl. No.: 335,648

[22] Filed: Apr. 10, 1989

Related U.S. Application Data

[63] Continuation of Ser. No. 108,654, Oct. 15, 1987, Pat. No. 4,820,780.

[51] Int. Cl.$^4$ ............................................. C08C 19/22
[52] U.S. Cl. ..................................... 525/351; 525/348
[58] Field of Search ................................ 525/348, 351

[56] References Cited

U.S. PATENT DOCUMENTS 3,915,907  10/1975  Hopper ............................... 525/351

Primary Examiner—Christopher Henderson
Attorney, Agent, or Firm—Alvin T. Rockhill

[57] ABSTRACT

Chlorothio-sulfonamide modified rubbery terpolymers, such as chlorothio-sulfonamide modified EPDM rubbers, have utility in a variety of applications. For example, such modified rubbers can be utilized in the sidewalls of pneumatic tires. Such modified rubbers are prepared by reacting a terpolymer of ethylene, an α-olefin containing from 3 to 6 carbon atoms, and a non-conjugated diene containing from 6 to 12 carbon atoms with a N-chlorothio-sulfonamide. The present invention is based upon the unexpected finding that the rate of this reaction can be greatly accelerated by conducting it in the presence of a saturated aliphatic carboxylic acid containing from 6 to 30 carbon atoms, such as stearic acid. The present invention accordingly disclosed in a method of preparing a N-chlorothio-sulfonamide modified terpolymer by reacting a terpolymer of ethylene, an α-olefin containing from 3 to 6 carbon atoms and a non-conjugated diene containing from 6 to 12 carbon atoms with a N-chlorothio-sulfonamide; the improvement which comprises conducting the reaction in the presence of at least one saturated aliphatic carboxylic acid containing from 6 to 30 carbon atoms.

19 Claims, No Drawings

MODIFICATION PROCESS USING N-CHLORO-THIOSULFONAMIDE AND RUBBER

This is a Continuation of Application Ser. No. 07/108,654, filed on Oct. 15, 1987 now issued as U.S. Pat. No. 4,820,780.

BACKGROUND OF THE INVENTION

Mixtures or blends of low-unsaturation rubbery polymers with highly unsaturated rubbery polymers are of practical importance because of the superior ozone resistance imparted to the blend of the low-unsaturation rubber. Unfortunately, the presence of the low-unsaturation rubber also affects the mechanical and hysteresis characteristics of the vulcanizates in an adverse manner, as manifesed by lower tensile strength and modulus values, and by higher dynamic heat build-up and permanent set. These undesirable phenomena are generally the result of the mutual insolubilities of the two types of rubber, the substantially slower cure rate of the low-unsaturation rubber, and the greater affinity of the typiaally polar curatives for the high-unsaturation rubber. As a net result, the vulcanized blend is a heterogeneous dispersion of largely uncured low-unsaturation rubber in well cured high-unsaturation rubber. The degraded mechanical and hysteresis properties caused by this unbalanced cure severely limit, or preclude, the use of such blends in articles subjected to severe service requirements such as tires. A process for improving the physical and dynamic properties of such rubbery polymer vulcanized blends is of considerable commercial practical importance.

It is, therefore, an object of this invention to provide a modified rubbery polymer having a low degree of unsaturation, a process for its preparation and composites of blends of such mdified rubbery polymer with high-unsaturation rubbery polymers.

U.S. Pat. Nos. 3,915,907 and 3,970,133 disclose a rubbery composition which is comprised of an admixture of a rubbery terpolymer of ethylene, α-olefin containing 3 to 6 carbon atoms and a non-conjugated diene containing 6 to 12 carbon atoms with an N-chlorothio-sulfonamide of the formula:

$$R^1SO_2N-SCl$$
$$\phantom{R^1SO_2N-S}|$$
$$\phantom{R^1SO_2N-}R^2$$

wherein the mole ratio of said N-chlorothio-sulfonamide to unsaturated sites in said terpolymer is in the range of about 0.06/1 to about 1/1, where $R^1$ and $R^2$ are selected from the group consisting of alkyl radicals having 1 to 20 carbon atoms, aralkyl adicals having 7 to 20 carbon atoms, alkaryl radicals having from 7 to 20 carbon atoms, and haloaryl radicals having 6 to 10 carbon atoms an where $R^1$ is also selected from radicals having the formula:

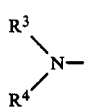

where $R^3$ and $R^4$ are individually selected from said alkyl, aralkyl, and haloaryl radicals and where $R^3$ and $R^4$ can be joined together to represent radicals selected from $-CH_2-_n$, where n is an integer of 4 to 7, and $-(CH_2)_2O-(CH_2)-_2$.

U.S. Pat. Nos. 3,915,907 and 3,970,133 disclose several techniques which can be utilized to incorporate chlorothio-sulfonamides into rubbery terpolymers. One such method involves addition of the chlorothio-sulfonamide to a solution of the polymer in an inert organic solvent such as heptane, hexane, tetrachloroethylene, cyclohexane, methyl cyclohexane, chloroform, benzene or toluene. More polar solvents are preferred since they increase the rate of formation of polymer bound adduct. For example, adduct formation occurs much more rapidly in chloroform as a solvent than in hexane. A mixture of nonpolar solvent with a highly polar solvent may be used advantageously. For example, a mixture of 40 volumes of hexane and 1 volume of acetic acid can produce susstantially faster adduct formation as compared to hexane alone. Furthermore, the rate of adduct formation can apparently be markedly improved by contact or catalysis with anhydrous zinc chloride.

A second method comprises swelling a solution of the chlorothio-sulfonamide into the polymer using the same type of solvents. Preferably, the solvent/polymer ratio is selected so that essentially all th solvent is taken up by the polymer. For this process, it is preferable that the polymer is first prepared in the form of small chunks, or crumbs, and the solvent then added.

A third technique comprise directly milling the chlorothio-sulfonamide into the polymer by means of an internal mixer (Banbury or extruder type) or an open roll mill. For direct mixing, it is advantageous to suspend or dissolve the chlorothio-sulfonamide in a relatively inert medium suhh as mineral oil or chlorinated paraffin in order to improve dispersion as well as minimize hydrolysis by atmospheric moisture.

In practice it has proven to be difficult to modify rubbery elastomers with N-chlorothio-sulfonamides due to slow reaction rates. For this reason, techniques for accelerating the reaction of N-chlorothio-sulfonamides and rubbery terpolymers, such as EPDM rubbers, have been sought.

SUMMARY OF THE INVENTION

This invention discloses a technique for greatly accelerating the rate a which rubbery terpolymers can be modified with N-chlorothio-sulfonamides. The technique of this invention simply entails carrying out such reactions in the presence of a saturated aliphatic carboxylic acid containing from 6 to 30 carbon atoms. Accordingly, the present invention specifically reveals in a method of preparing a N-chlorothio-sulfonamide modified terpolymer by reacting a terpolymer of ethylene, an α-olefin containing from 3 to 6 carbon atoms, and a non-conjugated diene containing from 6 to 12 carbon atoms with a N-chlorothi-sulfonamide; the improvement which comprises conducting the reaction in the presence of at least one saturated aliphatic carboxylic acid containing from 6 to 30 carbon atoms.

DETAILED DESCRIPTION OF THE INVENTION

U.S. Pat. Nos. 3,915,907 and 3,970,133, both of which are incorporated herein by reference in their entirety, disclose techniques for modifying rubbery terpolymers with N-chlorothio-sulfonamides. The present invention is practiced by simply carrying out such a modification in the presence of a saturated aliphatic carboxylic acid containing from 6 to 30 carbon atoms.

The N-chlorothio-sulfonamides utilized in this invention to modify terpolymers have the structural formula:

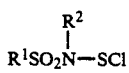

where $R^1$ and $R^2$ are selected from the group consisting of alkyl radicals having 1 to 20 carbon atoms, aralkyl radicals havig 7 to 20 carbon atoms, alkaryl radicals having from 7 to 20 carbon atoms, and haloaryl rdicals having 6 to 10 carbon atoms and where $R_1$ is also selected from radicals having the formula:

where $R^3$ and $R^4$ are individually selected from said alkyl, aralkyl, and haloaryl raiicals and where $R^3$ and $R^4$ can be joined together to represent radicals selected from $-CH_{2n}-$, where n is an integer of 4 to 7, and $-(CH_2)_2O-(CH_2)_2-$. In these N-chlorothio-sulfonamides, $R^1$ and $R^2$ are preferably selected from alkyl radicals having 1 to 6 carbon atoms, phenyl radicals, monoalkyl substituted phenyl radicals having from 7 to 10 carbon atoms and dialkylsubstituted phenyl radical having from 8 to 11 carbon atoms. Most preferably $R^1$ and $R^2$ are radicals selected from the group consisting of methyl groups, ethyl groups, propyl groups, butyl groups, phenyl groups, para-tolyl groups, and p-chlorophenyl groups.

Representative of the radicals suitable for $R^1$ are radicals selected from methyl, tert-butyl, cyclohexyl, 2-eicosyl, benzyl, 2-(p-n-undecylphenyl)-2-propyl, phenyl, 1-naphthyl, p-tolyl, 3-ethyl-4-(n-dodecyl)phenyl, p-chlorophenyl and 3-chloro-4-(n-butyl)phenyl radicals.

Representative of radicals suitable for $R^2$ are methyl, tert butyl, 1-eicosyl, cyclohexyl, benzyl, 1-(p-n-dodecylphenyl)-1-ethyl, phenyl, 1-naphthyl, m-tolyl, 3,4-di-(n-heptyl)phenyl, p-bromophenyl and 3-chloro-4-(n-butyl)phenyl radicals.

Representative examples of N-chlorothio-sulonamides which can be used in the present invention are N-chlorothio-N-methylmethanesulfonamide, N-chlorothio-N-methylbenzenesulfonamide, N-chlorothio-N-methyl-p-toluenesulfonamide, N-chlorothio-N-ethyl-p-toluenesulfonamide, N-chlorothio-N-methylethanesulfonamide, N-chlorothio-N-phenyl-p-toluenesulfonamide, N-chlorothio-N-(2-propyl)methanesulfonamide, N-chlorothio-N-(1-propyl)-p-chlorobenzenesulfonamide, N-chlorothio-N-phenylmethanesulfonamide, N-chlorothio-N,N',N'-trimethylsulfamide, N-chlorothio-N-methyl-N',N-(pentamethylene) sulfamide, N-chlorothio-N-methyl-N', N-diethylsulfamide and N-chlorothio-N-phenylbenzenesulfonamide.

Chlorothio-sulfonamides suitalle for use in the present invention, as well as their preparation, have further been described in the patent literature. For example, West German DPS 1,156,403, which is incorporated herein by reference in its entirety, shows the preparation of chlorothio-sulfonamides by reaction of a sulfonamide with $SCl_2$ in the presence of an organic aci acceptor. West German DPS 1,101,407 shows the preparation of chlorothio-sulfonamides from N,N'-dithiobis(-sulfonamides) and chlorine or sulfuryl chloride. The chlorothio-sulfonamides of the present invention canbe prepared by analogous procedures.

In the practice of this invention, rubbery terpolymers with low unsaturation applicable to the inventive process are terpolymers of ethylene, an α-olefin and at least one non-conjugated diene, wherein only one double bond of the diene enters into the polymerization process, and wherein the diene is incorporated to the extent of about 0.1 to about 1.0 moles per kilogram of polymer. Various α-olefins containing 3 to 6 carbon atoms can be used representative of which are propylene, 1-butene, 1-pentene, and 1-hexene. Propylene is preferred. Such types of rubbery terpolymers are well known and can conveniently be prepared by addition polymerization of the monomers in the presence of a coordination or Zeigler-type catalyst complex.

Peferably, the low unsaturation rubbery terpolymer is an ethylene-propylene diene terpolymer (EPDM) where said terpolymer comprises a mole ratio of ethylene to propylene in the range of about 30/70 to about 70/30 and contains about 0.1 to about 0.8 mole of non-conjugated diene termonomer per kilogram of polymer. Preferred are non-conjugated dienes having 6 to 12 carbon atoms suh as 1,4-hexadiene, dicyllopentadiene, 5-ethylidene-2-norbornene, 5-methylene-2-norbornene, 4,7,8,9-tetrahydroindene, and 1,5-cyclooctadiene.

The amount of N-chlorothio-sulfonamide needed to modify a given terpolymer depends upon a number of factors including the specific nature of the terpolymer being modified and the characteristics desired for the final vulcanizate. As a general rule from about 0.1 to about 10 phr (parts per hundred parts of rubber) of the N-chlorothio-sulfonamide will be utilized. In most cases it willbe preferred to utilize from about 0.5 to 5 phr of the N-chlorothio-sulfonamide modifier. As a general rule, the molar ratio of modifier to unsaturated sites in the polymer will be within the range of about 0.03/1 to about 1/1, but is preferably in the range of about 0.15/1 to about 0.8/1 and more preferably about 0.2/ to about 0.7/1. With some EPDM polymers, the use of high ratios can lead to polymer viscosity increases which make processing exceedingly difficult or even practically unmanageable. It is expected that, recognizing this, those having ordinary skill in the polymer compounding art will use a ratio which enhances characteristics of the final vulcanized blend without detrimentally increasing polymer viscosity beyond the point of ease of processability.

The amount of saturated aliphatic carboxylic acid needed in the modification procedures of this invention will generally be within the range of about 0.1 to 10 phr. It will normally be preferred for the amount of saturated aliphatic carboxylic acid utilized to be within the range of 1 to 6 phr with 3 to 4 phr being most preferred. The saturated aliphatic carboxylic acids which are utilized in the modification procedures of this invention will contain from 6 to 30 carbon atoms. Such saturated aliphatic carboxylic acids will preferably contain from 10 to 28 carbon atoms. The most preferred saturated aliphatic carboxylic acids will contain from 12 to 20 carbon atoms. The saturated aliphatic carboxylic acids tilized will be saturated and will accordingly be of the formula $C_nH_{2n+1}COOH$, wherein n is an integer from 5 to 29. Palmitic acid, lauric acid, and stearic acid are representative examples of saturated aliphatic carboxylic acids of this type. Branched saturated aliphatic carboxylic acids containing from 6 to 30 carbon atoms, such as 2-ethylhexanoic acid, can also be utilized to accelerate the modification reaction.

The modifications of this invention will preferably be carried out in an internal mixer, such as a Banbury mixer or an extruder. Such modifications are carried out by simply mixing the saturated aliphatic carboxylic acid and the N-chlorothio-sulfonamide modifier throughout the rubbery terpolymer being modified. Such modifications are normally conducted at an elevated temperature which is within the range of 60° C. to about 190° C. It is generally preferable for such modification procedures to be carried out at a temperature which is within the range of 100° C. to 170° C. with temperatures within the range of 110° C. to 160° C. being most preferred.

The saturated aliphatic carboxylic acids utilized in accordance with this invention accelerate the modification process to the degree necessary for such modifications to be carried out in extruders having typical residence times. For instace, the modification reaction can be carried out at a rate that makes the utilization ofextruders having residence times of 90 seconds or even less practical.

Unreacted modifier can react with water to produce hydrochloric acid as a reaction by-product. Hydrochloric acid typically has an adverse effect on extruders and other processing equipment. It also typically has an advere effect on the properties of the rubber being prepared. For these reasons, it is usually advantageous to carry out the modification procedures of this invention in the presence of an agent which will react with the hydrochloric acid produced to form a salt. For instance, calcium carbonate can be added which will react with any hydrochloric acid produced so as to form calcium chloride. It is normally desirable to utilize from 0.001 to 1 phr of calcium carbonate in the modification procedures of this invention. It will generally be preferred to utilize from 0.01 to 0.5 phr of calcium carbonate in such modification procedures with the utilization of 0.02 to 0.1 phr of calcium carbonate being most preferred.

This invention is illustrated by the following examples which are merely for the purpose of illustration and are not to be regarded as limiting the scope of the invention or the manner in which it can be practiced. Unless specifically indicated otherwise, parts and percentages are given by weight.

EXAMPLE 1

In this experiment an EPDM rubber was modified with N-chlorothio-N-methyl-benzenesulfonamide (CTMBS) in the presence of stearic acid. The EPDM rubber utilized in this experiment was DuPont Nordel TM 1660 which contains about 66% ethylene, about 28% propylene and about 5 to 6% 1,4-hexadiene. The modification was carried out in a 420 cc stainless steel Brabender Prep Mieer which was equipped with cam blades, an oil cooled jacket at 50° C., and a Brabender Model PLD-651 microprocessor-controlled drive unit. The Brabender mixer was run at 60 rpm. In the procedure utilized, 234 g of the EPDM was initially added with 0.05 g of calcium carbonate and 8.2 g of stearic acid. After a mixing time of about one minute, the temperature increased from 115° C. to 121° C. and 6.7 g of CTMBS was added. After 40 additional seconds of mixing time, the temperature had increased to 126° C. at which time 15 g of cyclooctadiene was added as a shortstop (to compete with EPDM for unreacted modifier by formation of a CTMBS-cyclooctadiene adduct). Mixing was continued for 4 additional minutes during which time the temperature continued to increase to 145° C. The EPDM was then discharge and cooled in ambient air. The modified EPDM produced was subsequently analyzed for bound adduct content utilizing UV spectroscopic techniques. It was determined that the modified EPDM produced contained 0.076 moles per kilogram of bound chlorothio-sulfonamide adduct.

COMPARATIV EXAMPLE 2

The procedure utilized in Example 1 was used in this experiment except that no stearic acid was initially added. However, 8.2 g of stearic acid was added in conjunction with the cyclooctadiene as a shortstop system. In this experiment, it was determined that the modified EPDM produced had a bound adduct content of only 0.025 moles per kilogram.

As can be determined by comparing Example 1 with Comparative Example 2, the presence of stearic acid during the modification procedure greatly increased the amount of chlorothio-sulfonamide adducted to EPDM present. In fact, the presence of stearic acid during the modification procedure resulted in a three fold increase in the amount of adduct formed. Thus, it is very apparent that saturated aliphatic carboxylic acids can be utilized to greatly increase the rate at which such modfication reactions proceed.

While certain representative embodiments and details have been shown for the purpose of illustrating the present invention, it will be apparent to those having skill in this art that various changes and modifications can be made therein without departing from the scope of the present invention.

What is claimed is:

1. In a method of preparing a N-chlorothio-sulfonamide modified terpolymer by reacting a terpolymer of ethylene, an α-olefin containing from 3 to 6 carbon atoms, and a non-conjugated diene containing from 6 to 12 carbon atoms with a N-chlorothio-sulfonamide; the improvement which comprises conducting the reaction in the presence of at least one saturated aliphatic carboxylic acid containing from 6 to 30 carbon atoms.

2. A method as specified in claim 1 wherein the reaction is carried out at a tmperature within the range of 60° C. to 190° C.

3. A method as specifiediin claim 2 wherein from 0.1 to 10 phr of saturated aliphatic carboxylic acids is present.

4. A method as specified in claim 3 wherein from 0.1 to 10 phr of N-chlorothio-sulfonamide is present.

5. A method as specified in claim 4 wherein said saturated aliphatic carboxylic acids contain from 10 to 28 carbon atoms.

6. A method as specified in claim 5 which further comprises conducting the reaction in the presence of 0.001 to 1 phr of calcium carbonate.

7. A method as specified in claim 6 wherein said reaction is conducted at a temperature within the range of 100° C. to 170° C.

8. A method as specified in claim 7 wherein from 1 to 6 phr of saturated aliphatic carboxylic acids are present.

9. A method as specified in claim 8 wherein from 0.5 to 5 phr of N-chlorothio-sulfonamide is present.

10. A method as specified in claim 9 wherein said N-chlorothio-sufonamide is selected from the group consistigg of N-chlorothio-N-methylmethanesulfonamide, N-chlorothio-N-methylbenzenesulfonamide, N- chlorothio-N-methyl-p-toluenesulfonamide, N-chlorothio-N-ethyl-p-toluenesulfonamide, N-chlorothio-N-methylethanesulfonamide, N-chlorothio-N-phenyl-p-toluenesulfonamide, N-chlorothio-N-(2-propyl)methanesulfonamide, N-chlorothio-N-(1-propyl)-p-chlorobenzenesulfonamide, N-chlorothio-N-phenylmethanesulfonamide, N-chlorothio-N,N',N'-trimethylsulfamide, N-chlorothio-N-methyl-N',N-(pentamethylene) sulfamide, N-chlorothio-N-methyl-N',N-diethylsulfamide and N-chlorothio-N-phenylbenzenesulfonamide.

11. A method as specified in claim 1 wherein said N-chlorothio-suffonamide is selected from the group consisting of N-chlorothio-N-methylmethanesulfonamide, N-chlorothio-N-methylbenzenesulfonamide, N-chlorothio-N-methyl-p-toluenesulfonamide, N-chlorothio-N-ethyl-p-tolunesulfonamide, N-chlorothio-N-methylethanesulfonamide, N-chorothio-N-phenyl-p-toluenesulfonamide, N-chlorothio-N-(2-propyl)methanesulfonamide, N-chlorothio-N-(1-propyl)-p-chlorobenzenesulfonamide, N-chlorothio-N-phenylmethanesulfonamide, N-chlorothio-N,N',N'-trimethylsulfamide, N-chlorothio-N-methyl-N',N-(pentamethylene) sulfamide, N-chlorothio-N-methyl-N',N-diethylsulfamide and N-chlorothio-N-phenylbenzenesulfonamide.

12. A method as specified in claim 8 wherein said saturated aliphatic carboxylic acid contains from 12 to 20 carbon atoms.

13. A method as specified in claim 12 wherein said reaction is carried out at a temperature within the range of 120° C. to 160° C. and wherein said N-chlorothio-sulfonamide is N-chlorothio-N-methylbenzenesulfonamide.

14. A method as specified in claim 16 wherein said reaction is carried out in the presence of 0.01 to 0.5 phr of calcium caroonate.

15. A method as specified in claim 13 wherein said reaction is carried out in the presence of 0.02 to 0.1 phr of calcium carbonate.

16. In a method of preparing a N-chlorothio-sulfonamide modified terpolymer by reacting a terpolymer of ethylene, an α-olefin containing from 3 to 6 carbon atoms, and a non-conjugated diene containing from 6 to 12 carbon atoms with a N-chlorothio-sulfonamide; the improvement which comprises conducting the reaction in an extruder in the presence of 0.1 phr to 10 phr of at least one saturated aliphatic carboxylic acid.

17. A method as specified in claim 1 wherein the saturated alihhatic carboxylic acid is lauric acid.

18. A method as specified in claim 4 wherein the saturated aliphatic carboxlic acid is lauric acid.

19. A method as specified in claim 8 wherein the saturated aliphatic carboxylic acid is lauric acid.

* * * * *